United States Patent
Magnan et al.

(10) Patent No.: US 9,297,506 B2
(45) Date of Patent: Mar. 29, 2016

(54) LED-BASED LIGHT FIXTURE

(71) Applicant: GE Lighting Solutions, LLC, East Cleveland, OH (US)

(72) Inventors: Sebastien Magnan, Lachine (CA); Christopher Henry Wilson, Lachine (CA); Francois Turgeon, Lachine (CA)

(73) Assignee: GE LIGHTING SOLUTIONS, LLC, East Cleveland, OH (US)

( * ) Notice: Subject to any disclaimer, the term of this patent is extended or adjusted under 35 U.S.C. 154(b) by 86 days.

(21) Appl. No.: 14/043,176

(22) Filed: Oct. 1, 2013

(65) Prior Publication Data

US 2014/0098564 A1    Apr. 10, 2014

Related U.S. Application Data

(60) Provisional application No. 61/709,957, filed on Oct. 4, 2012.

(51) Int. Cl.
| | |
|---|---|
| *F21S 8/00* | (2006.01) |
| *F21S 8/04* | (2006.01) |
| *F21K 99/00* | (2010.01) |
| *F21V 8/00* | (2006.01) |
| *F21Y 101/02* | (2006.01) |

(52) U.S. Cl.
CPC ... *F21S 8/04* (2013.01); *F21K 9/52* (2013.01); *G02B 6/0095* (2013.01); *F21V 2200/20* (2015.01); *F21Y 2101/02* (2013.01)

(58) Field of Classification Search
CPC .......... F21S 8/04; G02B 6/0095; F21K 9/52; F21Y 2101/02; F21V 2200/20
See application file for complete search history.

(56) References Cited

U.S. PATENT DOCUMENTS

| | | |
|---|---|---|
| 2007/0133193 A1 | 6/2007 | Kim |
| 2007/0279727 A1 | 12/2007 | Gandhi et al. |
| 2008/0019121 A1 | 1/2008 | Ly |
| 2008/0232093 A1 | 9/2008 | Kim |
| 2009/0116241 A1 | 5/2009 | Ashoff et al. |
| 2010/0103695 A1 | 4/2010 | Opitz |
| 2012/0170266 A1 | 7/2012 | Germain et al. |
| 2012/0236598 A1 | 9/2012 | Germain et al. |
| 2014/0056028 A1* | 2/2014 | Nichol et al. ............ 362/611 |

FOREIGN PATENT DOCUMENTS

| | | |
|---|---|---|
| DE | 202010001814 U1 | 6/2010 |
| EP | 1691003 A2 | 8/2006 |
| EP | 2184628 A2 | 5/2010 |

OTHER PUBLICATIONS

International Search Report, dated Mar. 6, 2014, related application serial No. PCT/US13/62989.

* cited by examiner

*Primary Examiner* — Thomas M Sember
(74) *Attorney, Agent, or Firm* — GE Global Patent Operation; Peter T. DiMauro

(57) ABSTRACT

LED-based light fixtures are presented that are configured for attachment to a substrate to advantageously function without a reflector and without a backing plate. A light fixture according to an embodiment includes a waveguide having a front surface and a rear surface for emitting light, the waveguide configured to optically couple to a surface of a substrate. The light fixture also includes at least one LED light source disposed on an edge of the waveguide to emit light into the waveguide. The waveguide is configured to emit a first portion of the light above the rear surface for reflection by the surface of the substrate back into the waveguide and through the front surface of the waveguide, and to emit a second portion of the light through the front surface.

23 Claims, 2 Drawing Sheets

LED-BASED LIGHT FIXTURE

CROSS REFERENCE TO RELATED APPLICATION(S)

This application claims the benefit of U.S. Provisional Patent Application No. 61/709,957 filed on Oct. 4, 2012, the contents of which are hereby incorporated by reference for all purposes.

FIELD OF THE INVENTION

Embodiments of the present invention generally relate to LED-based light fixtures. In particular, LED-based light fixtures are presented that include an LED light source, a waveguide, and mounting components, and that are configured for attachment to a substrate to advantageously function without a reflector and without a backing plate.

BACKGROUND OF THE INVENTION

In general, a troffer is a rectangular light fixture configured to fit into a modular dropped ceiling grid (for example, a two-foot by two-foot space, or a two-foot by four-foot space), and typical designs accommodate standard-size fluorescent lamps (such as T12, T8 or T5 bulbs). A waveguide troffer is a ceiling mounted luminaire or fixture that generally faces downward, and its purpose is to illuminate a space in a room, for example. Conventional waveguide troffers often include a light source, an opaque back cover, a reflector, a waveguide, and a front protector (which may be translucent to diffuse light from the light source, or may be transparent to allow the light from the light source to pass through). The optical system of such waveguide troffers operates to couple the light from the light source (typically one or more light-emitting diodes (LEDs)) into the waveguide. The waveguide has light extraction features that enable a portion of the light to exit the waveguide in a downward direction through the front protector and onto the space to be illuminated. However, the waveguide also directs a portion of the extracted light upward onto the reflector which then reflects that portion of light downward towards the space to be illuminated.

FIG. 1 is an exploded view of a conventional LED-based luminaire 100 that is configured to act as a troffer. One such typical luminaire is known as the LUMINATION™ LED Luminaire (which is available from GE Lighting Solutions, LLC), which produces an even glow and thus delivers exceptionally uniform light to fill a space. Such a luminaire may be configured to fit within a predefined space normally occupied by a ceiling tile within a dropped ceiling, for example, and has a front surface that lies flat or flush with the other ceiling tiles when in place. When not illuminated, such a luminaire may appear to a viewer as being free of a visible light source, and thus may blend in with the ceiling pattern or ceiling tile pattern.

Referring to FIG. 1, the LED-based luminaire 100 includes a light source 102, which generally includes a plurality of edge-lighting LEDs. The LEDs are positioned to be in optical communication with a light guide 104 (for example, a substantially planar waveguide). A reflector 106 is positioned above the light guide 104 and below a backing plate 108 (which may be, for example, an opaque back cover or a metallic plate). Thus, the reflector 106 is sandwiched between backing plate 108 and the light guide 104. A diffuser screen 112 is typically included on the outward-facing or downward-facing side of the LED-based luminaire 100, and operates to mix and/or diffuse the light emitted by the light source 102 and waveguide 104 configuration. Lastly, a trim portion 114 is provided for mechanical support of the various components, and may be designed to provide aesthetic appeal, for example, by matching the frame portions 116 surrounding the ceiling tiles 110.

SUMMARY OF THE INVENTION

A light fixture according to an embodiment includes a waveguide having a front surface and a rear surface for emitting light, the waveguide configured to optically couple to a surface of a substrate. The light fixture also includes at least one LED light source disposed on an edge of the waveguide to emit light into the waveguide. The waveguide is configured to emit a first portion of the light above the rear surface for reflection by the surface of the substrate back into the waveguide and through the front surface of the waveguide, and to emit a second portion of the light through the front surface.

The LED-based light fixtures presented herein advantageously create a unique look or present a different light fixture or lamp presentation because an underlying substrate, such as a decorative ceiling tile, is visible and apparent to an observer (for example, a consumer) when the LED-based lamp fixture is emitting light and when no light is being emitted. Such LED-based lamp fixtures according to the described embodiments enhance any underlying design of the substrate or ceiling tile when mounted thereon. Moreover, embodiments disclosed herein may provide improved optical efficiency of from between about 2% to about 8% or more in comparison to conventional LED-based troffers because no reflectors and/or backing plates are utilized, and thus a portion of the light exiting the top surface of the waveguide is not being absorbed in a reflector. Instead, this light is reflected back by a substrate (such as a ceiling tile) through the waveguide and outwards (downwards) through a transparent diffuser and output on an area to be illuminated.

In an advantageous embodiment, a light fixture kit includes a waveguide having a front surface and a rear surface. The waveguide is configured to optically couple to a surface of a substrate and to emit a first portion of light above the rear surface for reflection by the surface of the substrate, and to emit a second portion of light below the front surface. The kit also includes at least one LED light source disposed on an edge of the waveguide to emit light into the waveguide, and mounting hardware configured for attaching the rear surface of the waveguide to the surface of the substrate.

BRIEF DESCRIPTION OF THE DRAWINGS

Aspects and/or features of the invention and many of their attendant benefits and/or advantages will become more readily apparent and appreciated by reference to the detailed description when taken in conjunction with the accompanying drawings, which drawings may not be drawn to scale.

DETAILED DESCRIPTION

Figure 1:
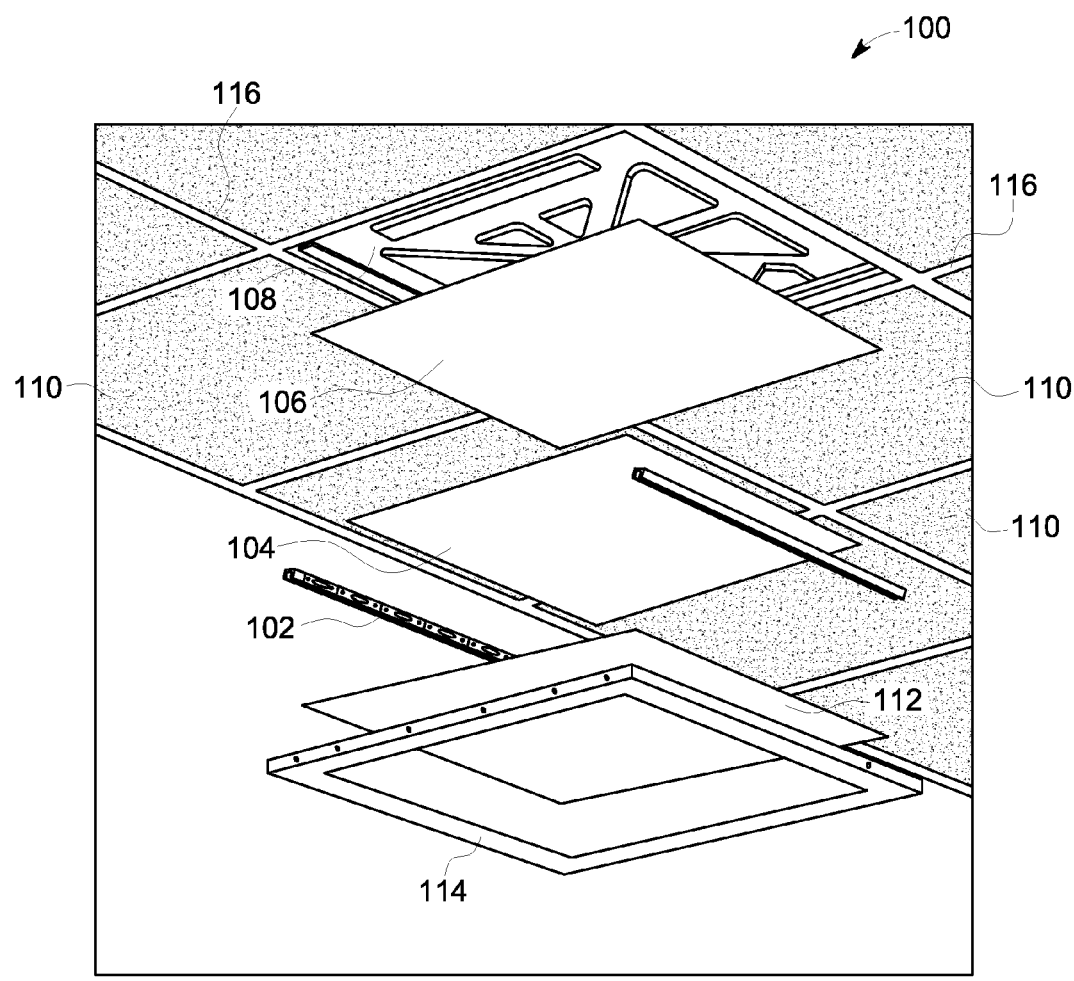
FIG. 1 is an exploded view of a conventional LED-based luminaire that is configured to act as a troffer.

In general, and for the purpose of introducing concepts of embodiments, described are LED-based lighting fixtures that permit the propagation of light throughout its structure, and in particular to LED lighting fixtures that include a waveguide to guide and/or to reflect light from one or more LEDs towards an area to be illuminated. In some embodiments, the waveguide provides a substantially uniform distribution of light from at least one LED light source to at least two edges of the LED-based lighting fixture, and possesses light extraction features which enable a portion of the light to exit the waveguide. In some implementations, the light extraction features of the waveguide direct the light downward, for example from a ceiling, onto the space to be illuminated. In particular, LED-based lighting fixtures in accordance with some embodiments described herein do not include any intervening material between the waveguide and a substrate to which the lighting fixture is affixed. Thus, absent from these described embodiments are, for example, reflectors and backing plates and/or any other type of opaque material that are found in conventional troffers between the waveguide and a substrate (for example, a ceiling tile or a wall panel). In such configurations, the waveguide is immediately adjacent to or touching the substrate, with nothing but air between them. However, in some embodiments at least one transparent material is included, such as a transparent protective cover, which may be positioned between the waveguide and the substrate as a protective layer.

A waveguide is typically defined by an extended region of increased index of refraction relative to the surrounding medium. For present purposes, a suitable waveguide has a thin aspect, which may be considered a thin slab, and may be of any arbitrary shape, but is often rectangular. In some embodiments, the waveguide may be relatively thin, for example, from about 1 millimeter (mm) to about 100 mm in thickness or greater (in some implementations, the waveguide may be from about 1 mm to about 10 mm thick, and in a particular embodiment may be about 4 mm thick). In some embodiments described herein, the waveguide may be fabricated, for example, from one or more of glass, plastic, polymers, or the like. The waveguide may also have a highly transmissive characteristic (for example, 50-99% transmissive, and in a particular implementation may be about 98% transmissive) when the LED-based lighting fixture is being viewed in an OFF condition such that it is not in operation. Such high transmission levels advantageously allow ambient light to pass through the LED-based lighting fixture when it is OFF so that the underlying substrate, for example a ceiling tile, can be seen in detail by an observer. This permits any type of ceiling pattern, for example, to be seen there-through such that LED-based ceiling tile fixtures according to embodiments have the appearance of having the same pattern as the adjacent ceiling tile onto which that LED-based ceiling tile fixture is affixed when the LED light source is not energized. Such LED-based ceiling tile fixtures are less expensive than conventional troffers and are also more aesthetically appealing to consumers.

Figure 2:
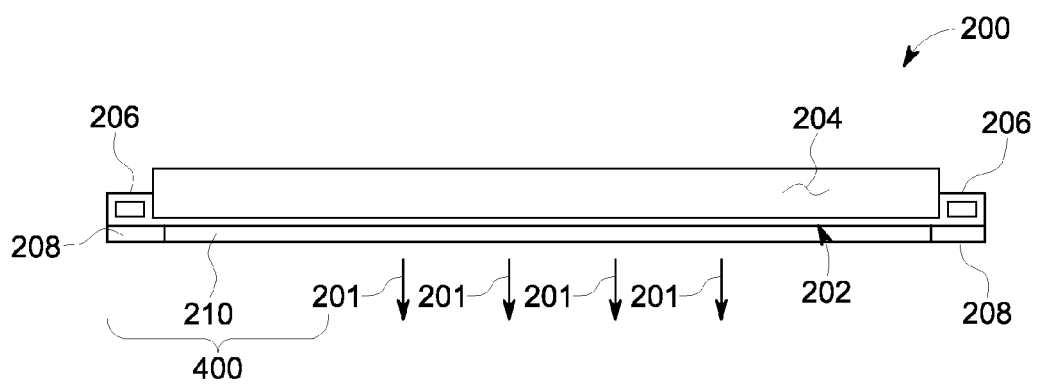
FIG. 2 is a side view of an LED-based troffer or LED-based light fixture according to an embodiment of the invention.

FIG. 2 is a side view of an LED-based troffer 200 or LED-based light fixture in accordance with an embodiment. In this example, the LED-based troffer 200 is configured as a ceiling tile light fixture to provide light during operation in the direction of arrows 201, in a generally downward direction. The troffer 200 includes a light guide or a waveguide 202 which may be affixed to (or positioned adjacent to) a ceiling tile 204 by mounting brackets 206 and within a trim or frame 208. In some embodiments, the LED-based light fixture is typically attached to a substrate (such as a ceiling tile or wall panel) by mounting hardware such as steel grids, furring strips, tack and clip systems, high strength adhesives, screws, nails, pins, mounting brackets, or the like. In general, the LED-based light fixture may be mounted in any effective manner, including known methods for affixing luminaires to ceiling tiles. An LED light source (not shown) may include components (not shown) that are housed within a portion of the brackets 206 and/or the frame 208, and are mounted on at least one edge of the waveguide 202 so as to direct light into the edge(s) of the waveguide 202. In some embodiments, the LED light source includes components such as a plurality of LEDs, driver circuitry which may be housed on one or more printed-circuit boards (PCBs), one or more heat sink(s), and electrical lead wires for connecting to a power supply (not shown). In some implementations, the LED-based troffer 200 also includes a power supply for supplying power to one or more of the LEDs of the LED light source, and may include a controller for controlling one or more of output light intensity, color, and a desired shape of the light provided by the LED light source (not shown).

In some embodiments, the shape of the waveguide is designed to substantially conform to an outward surface of a substrate, such as a ceiling tile or wall panel. For example, if a ceiling tile has a generally flat bottom surface (which surface faces towards a floor when installed), then the waveguide will also have a generally flat surface. In some cases, substrates such as ceiling tiles that are substantially flat also include decorative patterns inscribed therein, or have some curvature. In such cases, the waveguide 202 may still be substantially flat, which may depend on considerations such as aesthetics and cost factors.

Referring again to FIG. 2, the waveguide 202 functions to (as explained earlier) emit light both above a rear surface and below a front surface of the waveguide (which will be described in more detail below). In some embodiments, a light diffusive cover 210 is disposed adjacent to an outside surface of the waveguide 202. Such a light diffusive cover 210 functions to diffuse or soften the light being emitted from the LED-based troffer 200, to even out the light directed downward to reduce glare and harsh shadows. However, in contrast to the conventional troffer 100 shown in FIG. 1, the LED-based troffer 200 does not include a reflector and does not include any other type of opaque layer or cover between the waveguide 202 and the substrate or ceiling tile 204. But in some embodiments, a clear or transparent protective layer or transparent protector (not shown) may be disposed between the waveguide 202 and a substrate (such as the ceiling tile 204). Accordingly, some embodiments replace both a back cover and a reflector found in conventional waveguide troffers with a clear protector layer.

In FIG. 2, the waveguide 202 is optically coupled with the surface of the ceiling tile, but it should be understood that many other substrates may be used and are contemplated. For example, the substrate may be any one or more of a variety of structural elements that can typically found in a home or office, and/or inside or outside a house or a building. In particular, suitable substrates may include a portion of a ceiling, or a wall of a building (an indoor wall or an outdoor wall), or an indoor floor, or an outdoor floor (such as a sidewalk), or steps, or a path, or an exterior portion of a cabinet, or an exterior portion of a piece of furniture. In many embodiments, the substrate may comprise a conventional ceiling tile having any number of various functional and decorative patterns. For example, a particular type of ceiling tile may have a generally planar, rectangular shape, and can be fabricated from one or more materials such as perlite, wood, metal, mineral fiber, mineral wood, plastic, tin, aluminum, PVC, or the like. In such cases, the waveguide 202 may be modified or customized in some implementations to enhance features of the substrate by modulating the extraction of the light.

Figure 3:
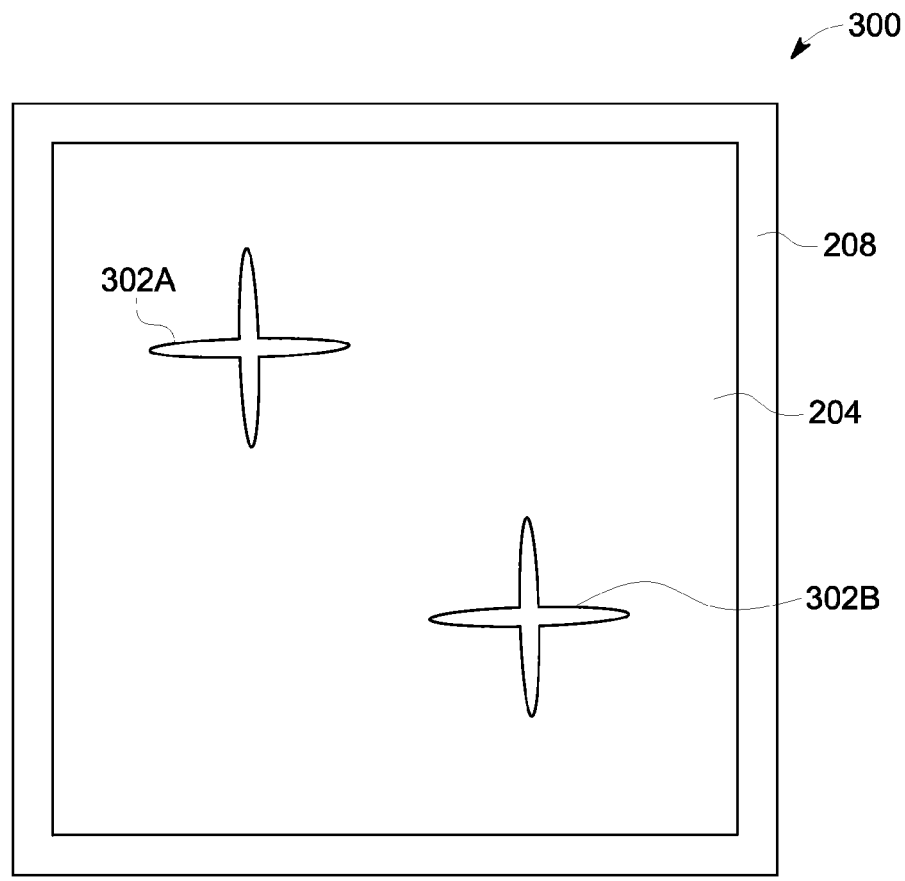
FIG. 3 is a bottom view of the LED-based troffer of FIG. 2 to illustrate that pattern markings on a substrate are visible through a substantially transparent diffusive cover and waveguide in accordance with the invention.

FIG. 3 is a bottom view 300 of the LED-based troffer 200 of FIG. 2. As shown, the ceiling tile 204 includes pattern markings 302A and 302B that are visible through the diffusive cover and waveguide (which are substantially transparent) of the LED-based light fixture 200. Accordingly, any pattern markings appearing on the substrate would be visible through the substantially transparent diffusive cover and waveguide. Also shown is the trim piece or frame 208 which provides mechanical support and stability to the LED-based troffer, and which may be designed or configured to match the design and/or configuration and/or color of any supporting structure or framework surrounding other ceiling tiles in a particular room, for example.

Figure 4:
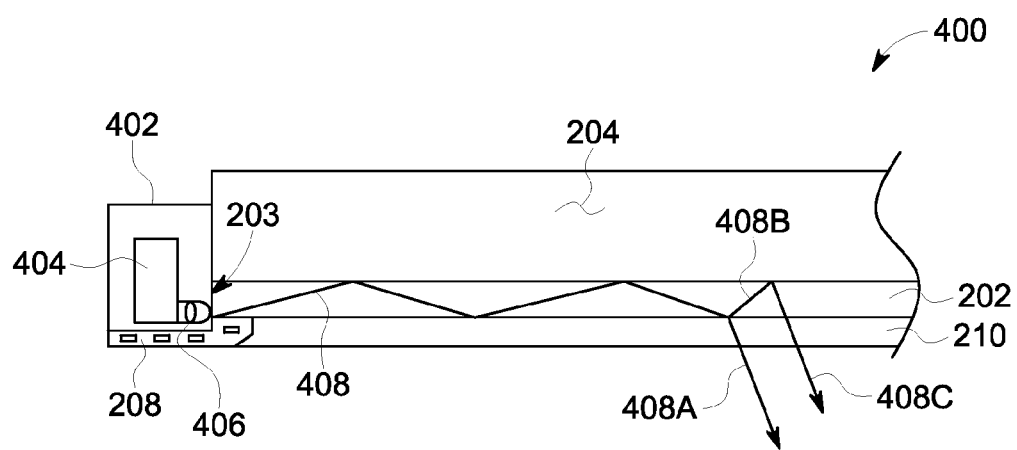
FIG. 4 is an enlarged, cutaway side view of an edge region of the LED-based troffer of FIG. 1 illustrating details thereof in accordance with embodiments of the invention.

FIG. 4 is an enlarged, cutaway side view 400 of an edge region (labeled "400" in FIG. 1) of the troffer 100 of FIG. 1. A light assembly 402 includes drive circuitry 404 (that may include one or more of the components discussed above) and a plurality of LED light sources 406 positioned adjacent to an edge 203 of the waveguide 202. The arrow 408 depicts light emanating from at least one LED light source 406 (in some embodiments, a plurality of LEDs are utilized) disposed at the edge 203 of the waveguide 202. In some embodiments, the light is internally reflected as shown through a predefined portion of the waveguide 202, and then eventually a portion of the light 408A is emitted below the waveguide 202 (in a downward direction towards the area to be illuminated), and a portion of the light 408B is emitted above the waveguide 202 (in an upward direction, towards the substrate or ceiling tile 204). The light portion 408B will generally be reflected back downward by the ceiling tile 204. This reflected light 408C then travels through both the waveguide 202 and the light diffusive cover 210 in a downward direction as part of the emitted light falling on the area to be illuminated. Thus, the upward portion 408B of the light extracted by the light extracting features of the waveguide 202 exits the LED-based luminaire towards the ceiling tile 204 and then is reflected downward by the ceiling tile.

In some embodiments, a hard transparent coating or durable transparent coating may be adhered to the bottom surface (or the exposed portion) of the waveguide as a transparent protective layer. Such a transparent protective layer may achieve, for example, dust protection and/or scratch protection for the waveguide.

In some embodiments, a kit may be produced and/or provided for purchase by a consumer, for example, that permits the consumer to construct a LED-based lamp fixture in accordance with the embodiments described herein. Thus, the kit may include a waveguide, at least one LED-based light source disposed on an edge of the waveguide (or for attachment to an edge of the waveguide), a frame, and mounting hardware. The LED-based light source provided with the kit is configured to emit light into the waveguide, and the waveguide may be designed or customized to optically couple to a surface of one or more types of substrate, such as a ceiling tile or wall panel. Written and/or audible instructions may also be provided to enable a consumer to mount or affix the kit components together and to a substrate to create an LED-based troffer or LED-based lighting fixture according to the embodiments described herein.

LED-based lamp fixtures in accordance with the embodiments described herein may advantageously exhibit improved light output capabilities in comparison to conventional troffers. In particular, the fact that the LED-based lamp fixtures lack a reflector means that there is no reflector to absorb a portion of the light from the LED light source. Thus, the optical efficiency of the LED-based lamp fixture 200 may be improved from between about 2% to 8% or more in comparison to a conventional LED-based troffer because a portion of the light exiting the top surface of the waveguide is not being absorbed in a reflector. Instead, this reflected light is reflected back by a substrate (such as a ceiling tile) through the waveguide and outwards (downwards) through a transparent diffuser and output on an area to be illuminated.

In addition, LED-based lamp fixtures in accordance with the embodiments described herein may beneficially create a unique look because the underlying substrate, such as a decorative ceiling tile, is visible and apparent to an observer (for example, a consumer) when the LED-based lamp fixture is in either of the ON and/or OFF state (i.e., when it is emitting light and when no light is being emitted). In particular, LED-based lamp fixtures according to the described embodiments enhance any underlying design of the substrate or ceiling tile when mounted thereon. For example, a ceiling may include ceiling tiles having a checkerboard pattern, and when the LED-based lamp fixtures according to embodiments described herein are affixed to such ceiling tiles, light can be emitted that is also in a checkerboard pattern.

The above description and/or the accompanying drawing is not meant to imply a fixed order or sequence of steps for any process referred to herein; rather any process may be performed in any order that is practicable, including but not limited to simultaneous performance of steps indicated as sequential.

Although the present invention has been described in connection with specific exemplary embodiments, it should be understood that various changes, substitutions, and alterations apparent to those skilled in the art can be made to the disclosed embodiments without departing from the spirit and scope of the invention as set forth in the appended claims.

What is claimed is:

1. A light fixture, comprising:
    a waveguide having a front surface and a rear surface for emitting light, the waveguide configured to optically couple to a surface of a substrate;
    at least one LED light source disposed on an edge of the waveguide to emit light into the waveguide, the waveguide configured to emit a first portion of the light above the rear surface for reflection by the surface of the substrate back into the waveguide and through the front surface of the waveguide, and to emit a second portion of the light through the front surface; and
    a transparent protector disposed between the rear surface of the waveguide and the surface of the substrate, wherein the rear surface of the waveguide is facing away from an area to be illuminated.

2. The light fixture of claim 1, further comprising a frame configured to support the waveguide and the at least one LED light source.

3. The light fixture of claim 1, further comprising mounting hardware for attaching the rear surface of the waveguide to the substrate.

4. The light fixture of claim 1, further comprising a diffusive cover affixed to the front surface of the waveguide.

5. The light fixture of claim 1, wherein the transparent protector is affixed to the rear surface of the waveguide.

6. The light fixture of claim 1, wherein the at least one LED light source comprises at least one of a plurality of LEDs, driver circuitry, at least one heat sink, and electrical lead wires.

7. The light fixture of claim 1, further comprising at least one of a power supply connected to at least one LED of the LED light source, and a controller connected to at least one LED light source for controlling at least one of output light intensity, color, and a shape of emitted light.

8. The light fixture of claim 1, wherein the substrate comprises a ceiling tile.

9. The light fixture of claim 8, wherein the waveguide is shaped to substantially conform to the shape of the ceiling tile.

10. The light fixture of claim 1, wherein the substrate comprises at least one of a substantially planar shape, a rectangular shape, and a square shape.

11. The light fixture of claim 1, wherein the waveguide has a thickness in a range of from about 1 millimeter (mm) to about 100 mm.

12. The light fixture of claim 11, wherein the waveguide has a thickness of about 4 mm.

13. The light fixture of claim 1, wherein the waveguide is fabricated from at least one of glass, a plastic material, and a polymer material.

14. The light fixture of claim 1, wherein the waveguide is about 50% to about 99% light transmissive.

15. The light fixture of claim 14, wherein the waveguide is about 98% light transmissive.

16. A light fixture kit, comprising:
a waveguide having a front surface and a rear surface, the waveguide configured to optically couple to a surface of a substrate and to emit a first portion of light above the rear surface for reflection by the surface of the substrate, and to emit a second portion of light below the front surface;
at least one LED light source disposed on an edge of the waveguide to emit light into the waveguide;
a transparent protector disposed between the rear surface of the waveguide and the surface of the substrate, wherein the rear surface of the waveguide is facing away from an area to be illuminated; and
mounting hardware configured for attaching the rear surface of the waveguide to the surface of the substrate.

17. The light fixture kit of claim 16, further comprising a frame configured to support the at least one LED light source and the waveguide.

18. The light fixture kit of claim 16, further comprising a diffusive cover affixed to the front surface of the waveguide.

19. The light fixture kit of claim 16, wherein the transparent protector is affixed to the rear surface of the waveguide.

20. The light fixture kit of claim 16, wherein the at least one LED light source further comprises at least one of a plurality of LEDs, driver circuitry, at least one heat sink, and electrical lead wires for connection to a power supply.

21. The light fixture kit of claim 16, further comprising further comprising at least one of a power supply connected to the at least one LED light source, and a controller connected to the LED light source for controlling one or more of output light intensity, color, and a desired shape of the light emitted by the LED light source.

22. The light fixture of claim 16, wherein the substrate is a ceiling tile.

23. The light fixture kit of claim 22, wherein the waveguide is shaped to substantially conform to the shape of the ceiling tile.

* * * * *